United States Patent [19]
Erlichman

[11] 3,739,701
[45] June 19, 1973

[54] NOVEL PHOTOGRAPHIC CAMERA FILM PROCESSING MEANS

[75] Inventor: Irving Erlichman, Wayland, Mass.

[73] Assignee: Polaroid Corporation, Cambridge, Mass.

[22] Filed: Dec. 20, 1971

[21] Appl. No.: 209,615

[52] U.S. Cl. .................................................. 95/13
[51] Int. Cl. ............................................ G03b 17/52
[58] Field of Search.......................... 95/11, 13, 89

[56] References Cited
UNITED STATES PATENTS

| | | | |
|---|---|---|---|
| 3,350,990 | 11/1967 | Finelli et al. | 95/13 X |
| 3,318,221 | 5/1967 | Erikson | 95/13 X |
| 2,638,828 | 5/1953 | Bachelder et al. | 134/62 X |

Primary Examiner—Samuel S. Matthews
Assistant Examiner—Alan Mathews
Attorney—Charles Mikulka, Robert F. Peck and Michael Bard et al.

[57] ABSTRACT

The present invention envisions a reflex camera having a specular surface within the optical path to the film plane. An operator mechanism positions a viewing surface closely proximate the film plane for focusing purposes and in a subsequent exposure mode positions a reflective surface within the optical path in a position causing a coincidence of a focal plane with the film plane.

The camera includes a processing station, having a pair of processing rolls, and a support for locating a film-advancing apparatus for engaging and moving the film unit, subsequent to exposure, from its exposure position into the bite of said processing rolls. The processing rolls are initially releasably retained in predetermined spaced relation to facilitate the reception of the exposed film unit for processing. Thereafter, the releasable retaining means is disengaged to allow the processing rolls to resiliently close on the film unit. The releasable retaining means is further disabled to prevent it from securing the rollers in spaced relation as a result of their being urged apart, as by a high spot on the film unit.

20 Claims, 17 Drawing Figures

Patented June 19, 1973

INVENTOR.
IRVING ERLICHMAN
BY *Brown and Mikulka*
and
*Michael Bard*
ATTORNEYS

INVENTOR.
IRVING ERLICHMAN

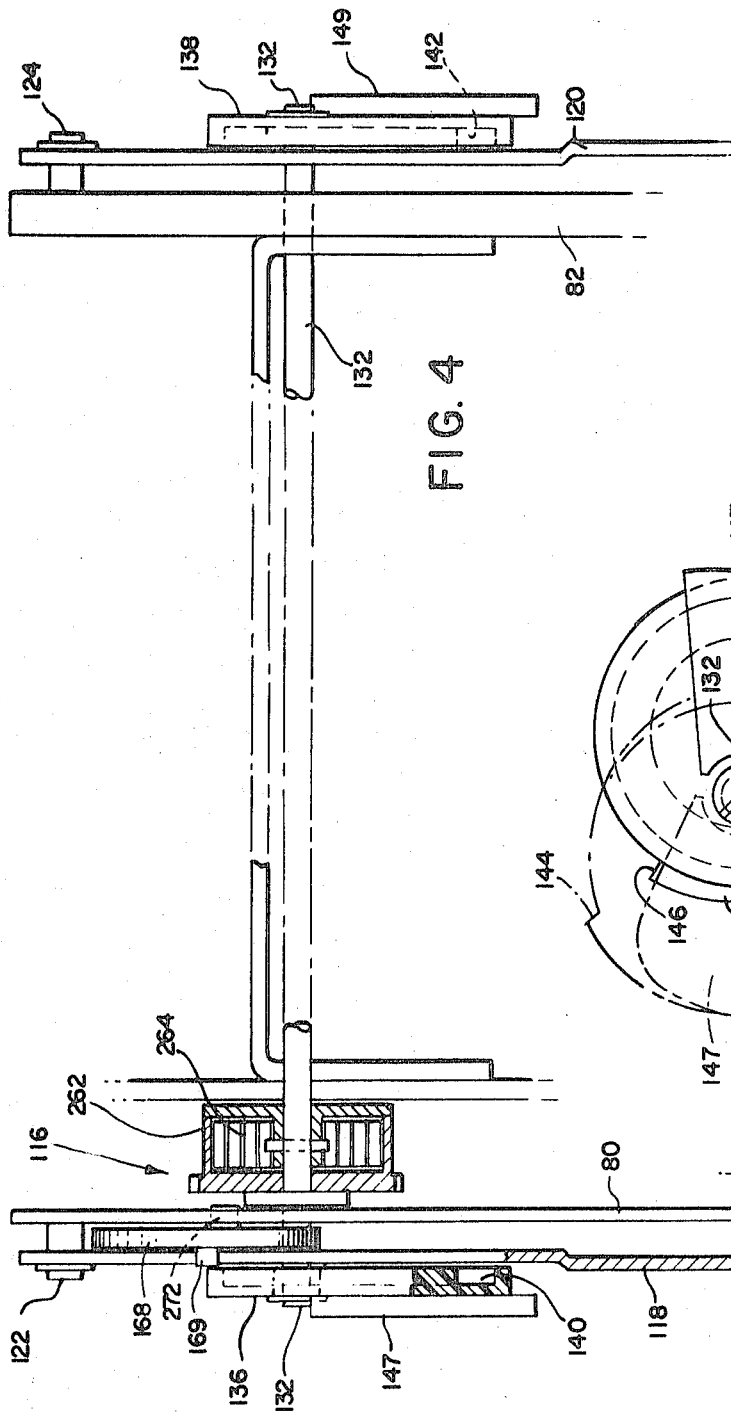
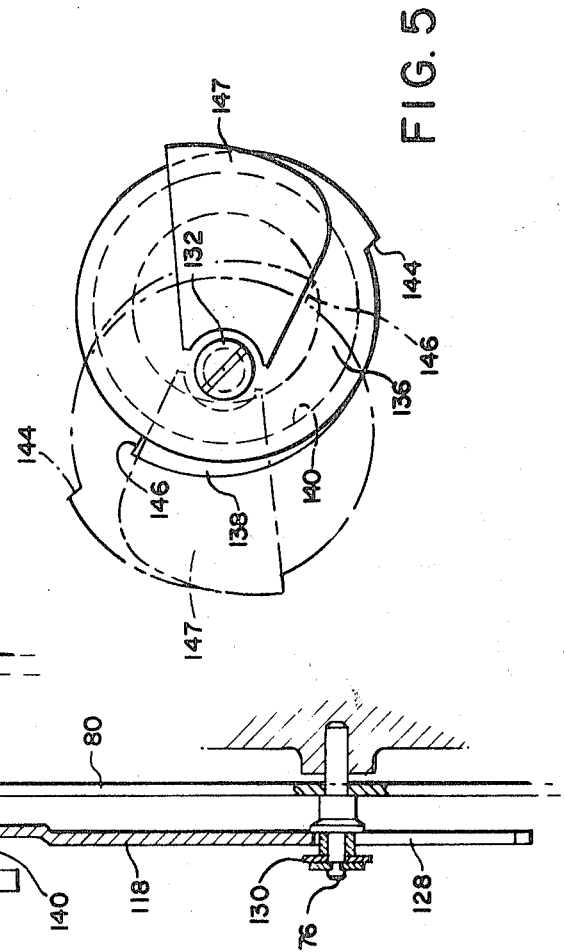

Patented June 19, 1973

INVENTOR.
IRVING ERLICHMAN
BY Brown and Mikulka
and
Michael Bard
ATTORNEYS

INVENTOR.
IRVING ERLICHMAN

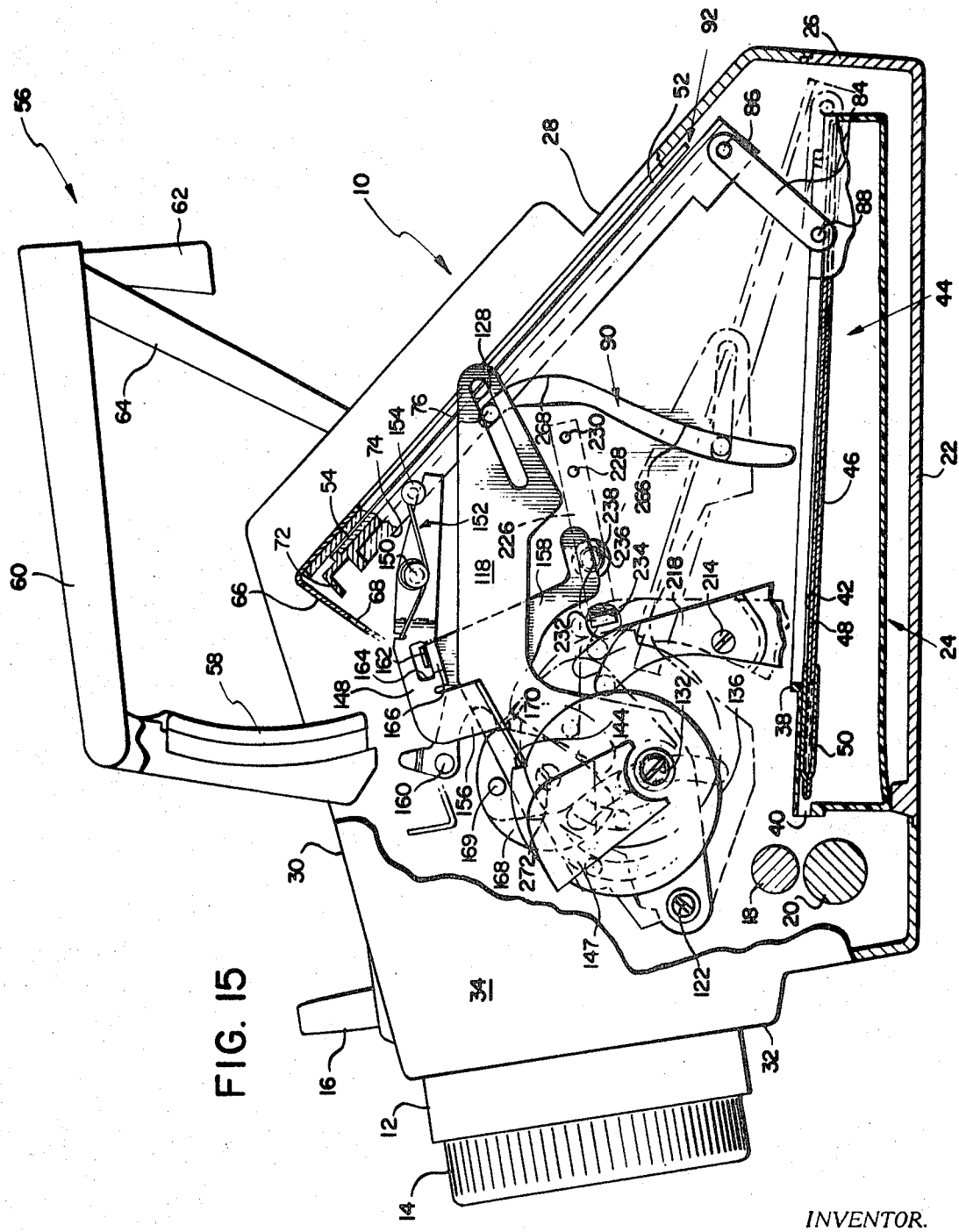

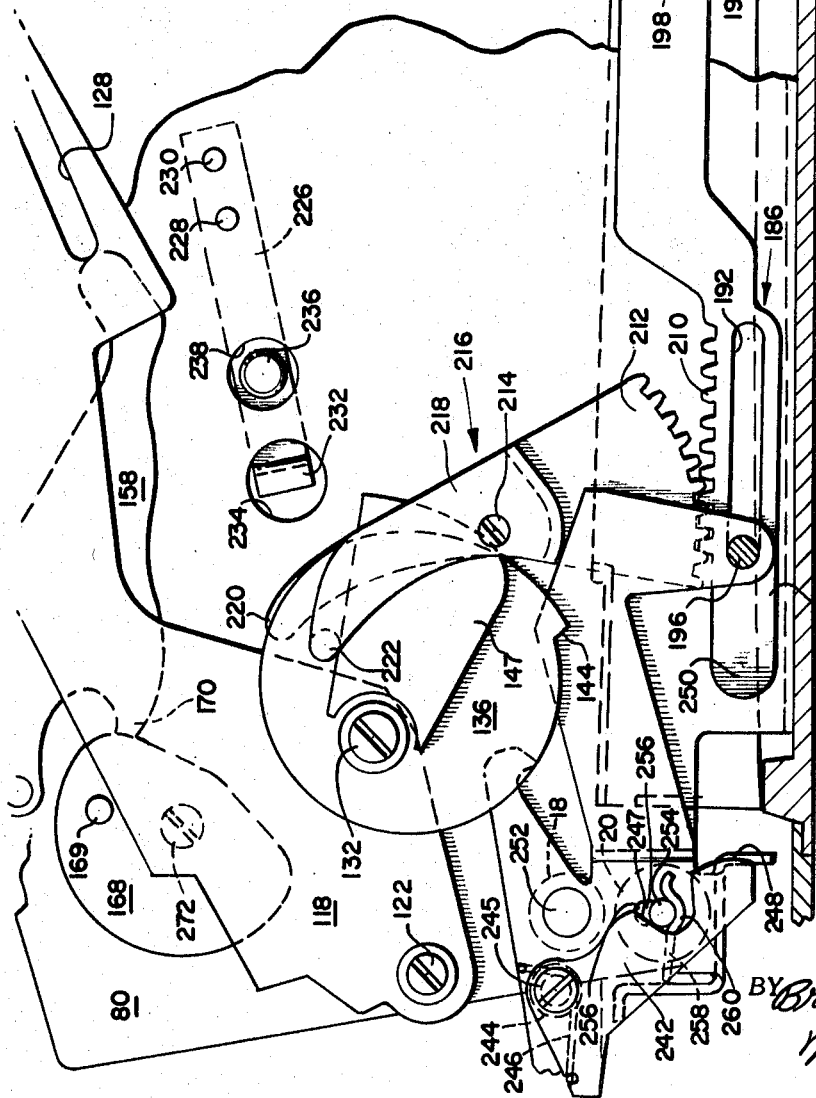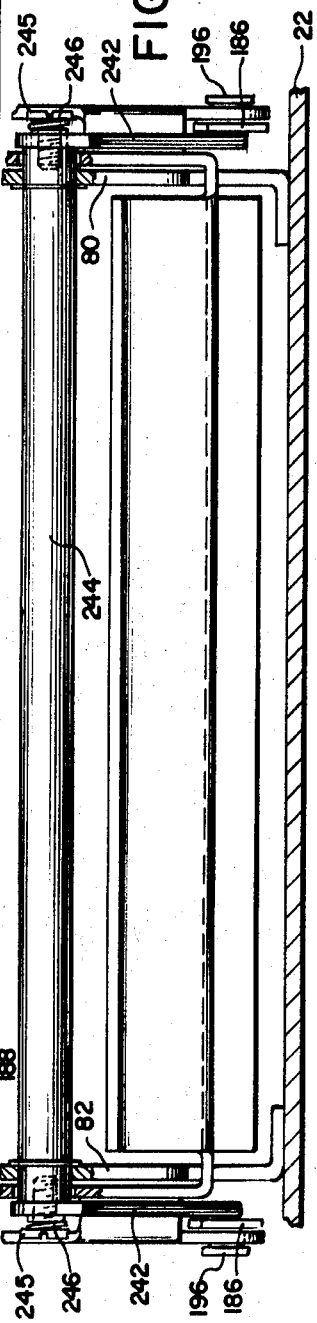

NOVEL PHOTOGRAPHIC CAMERA FILM PROCESSING MEANS

BACKGROUND OF THE INVENTION

The present invention relates generally to self-processing photographic cameras of the reflex type and, more particularly, to a reflex camera in which a specular surface is moved into the optical path of a taking lens when the camera is caused to assume an exposure configuration.

Certain photographic film materials are structured to directly record a positive image of any subject properly imaged and exposed thereupon. Exemplary of such materials are the film units described in U.S. Pat. No. 3,415,644 entitled "Novel Photographic Products and Processes" and issued to E. H. Land on Dec. 10, 1968. Film units of this type are intended for use within the above-noted self-processing photographic cameras and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the units.

To image properly through a lens system upon the above-described film units, it is necessary that one or an odd number of specular surfaces be incorporated within the optical path extending from the camera lens to the exposure plane of a film unit. Because these film units are configured to provide a desirably large film format, certain improved photographic camera designs have taken advantage of the requisite specular surface to achieve somewhat compact overall camera structures.

Exemplary of such compact designs is a camera structure described in copending application, Ser. No. 67,051, filed Aug. 26, 1970, and entitled "Photographic Apparatus."

Typically, one of the problems associated with reflex cameras, such as described hereinabove, is the time delay between actuation of the camera's shutter release button and the exposure of the film unit located in position for exposure. During this time delay, the user of the camera must hold the camera relatively steady until the camera's shutter is closed, the viewfinder and/or rangefinder are conditioned to prevent the entry of actinic light into the interior of the camera, the reflex mirror or a reflecting member has moved to a position which will allow exposure of the film unit, and the camera's shutter has opened and closed to allow the exposure.

In the camera which is the subject matter of application Ser. No. 67,051, mentioned hereinabove, this time delay may be decreased by increasing the speed at which the reflex mirror is moved out of its viewing mode position and into its exposure mode position by preloading a spring drive rather than employing a conventional motor-operated drive wherein the motor has to overcome its own inertia and that of the components connected thereto in driving the reflex member between modes of operation. However, increasing the speed at which the reflex member moves can create additional problems such as jerking of the camera caused by impact of the reflex member.

Further, the photographic camera which is the subject of said application Ser. No. 67,051, includes means connected between the moving reflex member and film-advancing apparatus to absorb a portion of the energy being transferred to the moving reflex member so as to rapidly decelerate same. This mode of deceleration means provides an undesirable load on the moving reflex member whilst it is traveling to its viewing mode position and which may be severe enough to damage said moving reflex mirror.

It has been found that the added load on the spring means, due to the film-advancing apparatus, may lead to the reflex mirror's failing to reach the viewing mode position. Not only does such failure prevent the proper commencement of a new photographic cycle, but the film units may be exposed to spurious illumination by the failure of the reflex mirror to cap the exposure plane.

Another problem associated with self-processing cameras such as the reflex camera described hereinabove resides in properly positioning the processing rolls to facilitate the reception of an exposed film unit therebetween and to insure the proper processing of same.

SUMMARY OF THE INVENTION

The subject invention includes a camera of the single lens reflex type having a planar wall which fixedly secures a specular member interposed between a lens and film plane. The invention further includes a reflex member having opposed reflecting surfaces, one of which functions to reflect the image of a subject to the film plane and the other of which functions as a reflective viewing screen.

The reflex member is mounted for pivotal movement between a first position wherein the viewing screen is positioned at a focal plane overlying and proximate the film or exposure plane and a second position wherein the reflecting surface opposite the viewing surface is positioned overlying the fixed specular surface so as to redirect an image toward said film or exposure plane. Thus, in the first position said reflex member functions as a component of the camera's viewing system, and in the second position it functions as part of the exposure system.

Film-advancing apparatus is coupled to the linkage driving said reflex member whereby movement of said reflex member from said second position to said first position will cause said film-advancing apparatus to engage and move a film unit from its exposure position into the bite of a pair of processing rolls whereby the kinetic energy possessed by the moving reflex member may be partly absorbed in advancing said film unit without any consequent loading of said reflecting member and attendant structural degradation thereof.

In order to provide as small an interruption as possible of the user's view of the subject while photographing same, means are provided for moving the reflecting member from the first position to the second position and back to the first position as rapidly as possible and creating a great amount of kinetic energy which must be absorbed to prevent damage to the reflecting member and other camera components as well as discomfort to the user. Such absorption is effected as aforesaid.

The means for rapidly driving the reflecting member between said first and second position includes energy storage means in the form of a spring member and motor means which transfers energy to said energy storage means when said reflecting member reaches said first position. Hence, the reflecting member is rapidly driven from the first position to the second position and back to the first position by means of the energy storage spring.

In order to insure that the reflex member moving means will not be unduly loaded by the film-advancing apparatus, whereby said member will stop between said first and second positions, an auxiliary driving system is provided for both the reflex member and the film-advancing apparatus. This auxiliary driving system includes a cam driven by said uni-directional motor and which engages said novel cam and linkage assembly after a predetermined time following the completion of a photographic exposure.

A novel linkage assembly is provided which releasably retains the processing rolls in predetermined spaced relation to facilitate the movement of a film unit from its exposure position into the bite of said processing rolls. Immediately thereafter, the film-advancing apparatus will engage said linkage assembly to cause same to release one of the processing rolls.

The processing rolls are resiliently urged together by spring means upon release of one of said processing rolls, as aforesaid. The spring means causes the processing rolls to press on the film unit with suitable pressure to effect the proper processing of same.

A novel cam and linkage assembly is provided to disable said linkage assembly to prevent same from recapturing the released processing roll until the exposed film unit has been completely processed. Such recapturing might otherwise occur prematurely as if the processing rolls were spread apart by an unwanted high spot in the film unit.

In consequence of the foregoing, it is an object of this invention to provide film-processing apparatus for use with a photographic camera of the type adapted to expose a self-developing film unit.

Another object of this invention is to provide film-processing apparatus for use with self-developing film and having processing rolls which are initially secured in spaced relation and resiliently urged together after a predetermined time interval.

Still another object of the instant invention is to provide film-processing apparatus for use with a photographic camera including a pair of processing members wherein said apparatus includes means to prevent the improper separation of said members as a result of any irregularity in an exposed film unit.

Yet a further object of the instant invention is to provide in a self-developing single lens reflex photographic camera having a reflex member capable of rapid movement from an exposure mode position to a viewing mode position and means to advance a film unit to a processing station simultaneously with movement of said reflex member from said exposure mode position to said viewing mode position, means to insure proper processing of an exposed film unit irrespective of any irregularities in the thickness of said film unit.

DESCRIPTION OF THE DRAWINGS

Other objects and many of the attendant advantages of the instant invention will be better appreciated and said invention will become clearly understood by reference to the following detailed description when considered in conjunction with with the accompanying drawings illustrating one embodiment of the subject invention, wherein:

FIG. 4 provides a simplified plan of a portion of the drive mechanism on both sides of the camera of the subject invention partly in section;

FIG. 5 provides a detailed plan of the cam wheels at opposite sides of the mechanism of FIG. 4, as seen from one of said sides and showing their relative positions both when the reflex member is in said first position (in solid line) and in said second position (in phantom line);

FIG. 14 provides an enlarged detail of a portion of the film-advancing mechanism of FIG. 12;

FIG. 15 provides a simplified plan of a portion of the instant invention illustrating the auxiliary drive system thereof in operation;

FIG. 16 provides a simplified front elevation of a portion of the novel film unit processing apparatus of the subject invention; and FIG. 17 provides a simplified side elevation of a portion of the film-advancing mechanism and film unit processing mechanism of the camera of the subject invention.

Figure 1:
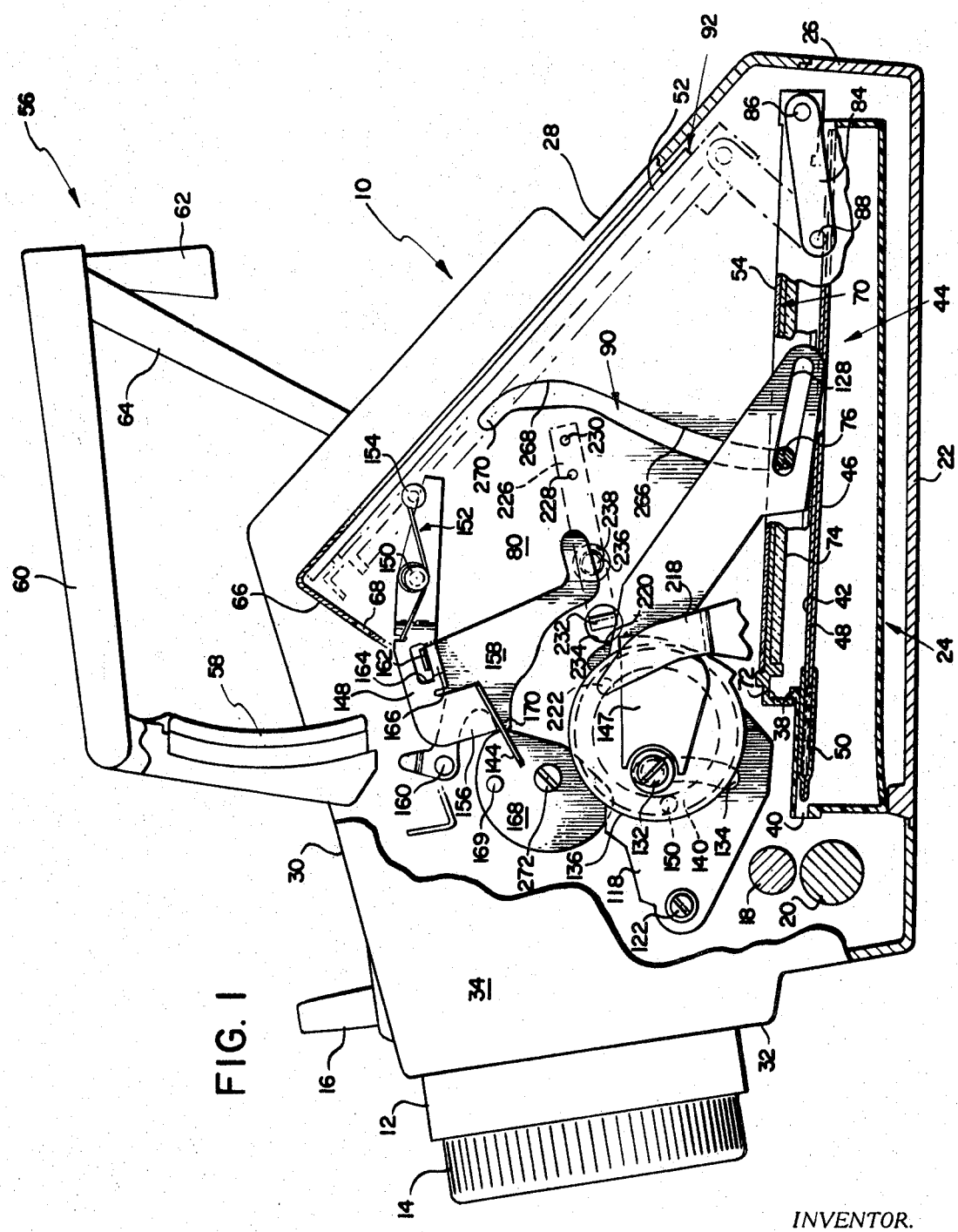
FIG. 1 provides a side elevation, partly in section, of a camera embodying the instant invention.

Referring to the drawings in more detail, and more particularly to FIG. 1, a photographic camera of the single lens reflex type is illustrated generally at 10 and is generally similar to the cameras which are the subject of U. S. Pat. application, Ser. No. 28,567, filed Apr. 15, 1970, by Edwin H. Land and commonly assigned herewith (Case 4081), and U. S. Patent Application, Ser. No. 67,051, previously mentioned supra. The camera 10 is provided with a forwardly disposed exposure control system housing 12 within which are mounted all of the components required to regulate light passing into the camera. These components include, but are not limited to, an objective lens assembly illustrated generally at 14, a shutter mechanism (not shown), an actuation button 16 (FIGS. 1 and 13), and electronic control circuitry (not shown). A pair of film unit processing rolls 18 and 20 are provided within said camera 10 for properly processing an exposed film unit, as explained infra.

The photographic camera 10 is further provided with a bottom support portion 22 which serves as a receiving and retaining chamber for a film-laden cassette structure as at 24. The bottom support portion 22 extends to a rear wall portion 26 which extends upwardly to an elongated upper rear portion 28 which, in turn, extends to an elongated upper forward portion 30.

The elongated upper forward portion 30 extends to a front wall portion 32 which supports the exposure control system housing 12. A pair of spaced parallel side wall portions 34 and 36 cooperate with the portions 22, 26, 28, 30 and 32 to define a chamber within which a photographic exposure may take place. The film-laden cassette structure 24, positioned overlying the bottom support portion 22 of the camera, is formed as a generally thin parallelepiped having a top open portion, the rectangular periphery of which is defined by an integrally formed ridge 38. The forwardmost facing side of the cassette structure 24 is formed incorporating an opening or slot 40 generally aligned with the line of tangency between the processing rolls 18 and 20 when they are brought together as hereinafter explained.

The cassette structure 24 is removably insertable within a cassette receiving chamber at the bottom support portion 22 so as to consistently and accurately orient an exposure plane 42 established at the lowermost periphery of the film frame opening defined by the ridge 38. A detailed disclosure of mechanisms for supporting cassettes such as the cassette 24, as at the bottom support portion 22, within the camera 10 are disclosed in U. S. Pat. application, Ser. No. 29,753, filed Feb. 24, 1970, by Edwin H. Land and Alfred H. Bellows, and commonly assigned herewith.

Coincidentally situated at the exposure plane 42 is an uppermost one of a plurality of film units 44. As described in more detail in U. S. Pat. No. 3,415,644, aforesaid, each of the plurality of film units 44 includes all of the materials necessary to produce a positive photographic print. Each of the plurality of film units 44 is physically structured to include a photosensitive element 46 positioned adjacent and in laminar relationship with an image-receiving element 48. The image-receiving element 48 is located upwardly from the element 46 and is urged by spring means (not shown) into the exposure plane 42.

A rupturable container 50 of processing fluid is secured to one end of the laminar assembly of the elements 46 and 48 and is located forwardly within the cassette structure 24. The rupturable container 50 dispenses its processing fluid between the elements 46 and 48 when subjected to appropriate compressive pressure. Each of the plurality of film units 44 is adapted to be processed when advanced, rupturable container 50 foremost, through the slot 40 and between the pressure applying processing rolls 18 and 20. The latter manipulation causes the rupturable container 50 to dispense its fluid contents between the elements 46 and 48 and to spread the fluid between and in contact with said elements 46 and 48.

The image-forming process is now well known in the art and involves the formation of transverse image-forming substances in the exposed photosensitive element accompanied by their diffusion in a manner forming a visible, positive image.

In the illustrated one of the film units 44 and as described in said U. S. Pat. No. 3,415,644, the processing fluid includes an opacifying agent which is spread as a layer between the photosensitive element 46 and the image-receiving element 48. The opacifying agent is opaque to actinic radiation and provides a background for the photosensitive transfer image evolved in the process.

The components of the camera 10 normally assume a configuration for operating in a focusing or viewing mode. During a photographic cycle, however, these components are reoriented to assume an exposure mode configuration. As best seen in FIG. 1, the components of the camera 10 are shown as they assume a focusing mode configuration. In this configuration, the objective lens assembly 14 focuses the light from a subject along an optical path which extends from the objective lens assembly 14 and across the exposure chamber of the camera 10 until it impinges upon and is reflected from a stationary reflex mirror 52.

The stationary mirror 52 is fixedly secured to the elongated upper rear portion 28 of the camera 10 within the exposure chamber. The light reaching the stationary reflex mirror 52 from the objective lens assembly 14 is reflected from said mirror 52 and the optical path courses to a viewing surface indicated generally at 54. The viewing surface 54 is reflective to light and reflects the light impinging thereon back to the upper portion of the stationary reflex mirror 52.

The camera 10 is provided with viewfinder apparatus indicated generally at 56 which is secured to the elongated upper forward portion 30 and the elongated upper rear portion 28 of the camera 10 in a well-known manner. The viewfinder apparatus 56 includes a generally concave reflecting surface 58 which is articulately connected at one end portion to the elongated upper forward portion 30 of the camera 10, and at its other end portion to one end portion of an upper housing wall 60 of the viewfinder assembly 56.

An eye lens assembly 62 is secured to the other end portion of the wall 60 which, in turn, is articulately secured to a link arm 64 which is hingeably secured to the portion 28 of the camera 10.

The portions 28 and 30 of the camera 10 are provided with a recess (not shown) into which the viewfinder assembly 56 may be folded from its erect operating position (shown in FIG. 1) to a storage position (not shown) adjacent the elongated upper forward portion 30 and the upper rear portion 28 of the camera 10. Additionally, the viewfinder apparatus 56 may be provided with a generally lighttight casing (not shown) to exclude ambient light so that an image seen in the viewing apparatus 56 is not hidden by glare.

A baffle plate 66 is secured within the camera 10 in a well-known manner adjacent the exposure chamber thereof and is provided with an aperture 68 which communicates between the exposure chamber and the viewfinder apparatus 56, whereby any light reaching the viewfinder apparatus 56 from the exposure chamber of the camera 10 must pass through said aperture 68.

The aperture 68 is so positioned that the mean optical path courses from the upper portion of the stationary mirror 52 through said aperture 68 to the generally concave reflecting surface 58 and, thence, to the eye lens assembly 62. Thus, light rays emanating from the image formed on the viewing surface 54 are reflected by the stationary reflex mirror 52 through the aperture 68 onto the concave reflecting surface 58 in the viewing apparatus 56. The concave reflecting surface 58 forms a real, erect, unreverted image of a subject. The eye lens assembly 62 magnifies the image formed by the concave reflecting surface 58 for the viewer, but does not affect its erect, unreverted nature and the magnified image is virtual.

With the arrangement above described, the photographic camera 10 may be focused by adjusting the objective lens assembly 14 while simultaneously viewing the image on the viewing surface 54 from the viewfinder apparatus 56. With this focusing mode of operation, the optical path may be considered to have a predetermined length and the objective lens assembly 14 may be considered to establish a focal plane which, when the camera is in a focusing mode, lies in coincidence with the viewing surface 54. For a more complete understanding of the optics of the viewing system herein described, reference may be made to copending application, Ser. No. 98,356, filed Dec. 15, 1970, and entitled "Reflex Camera and Viewing Device" (Case 4092) which reveals a somewhat similar system which functions in an analogous manner.

The viewing surface 54 is mounted upon, or formed as an integral component of, a reflex member shown generally at 70 and said surface 54 is preferably somewhat smaller than, but with the same shape as, the film format at the exposure plane. If the viewing surface 54 has the same shape as the film format, it aids in framing the subject; having the surface 54 slightly smaller than the film format reduces the chances for accidentally cutting off a portion of the subject by a minor framing error.

Formed of a material opaque to light, the reflex member 70 is of generally flat configuration and includes a peripheral rib portion or frame 72. The frame 72 is generally rectangular in shape and dimensioned to nest over the ridge 38 of the cassette structure 24. As a consequence of this configuration, the reflex member 70 functions to light seal or cap the exposure plane 42 at which the uppermost one of the plurality of film units 44 is situated.

Figure 2:
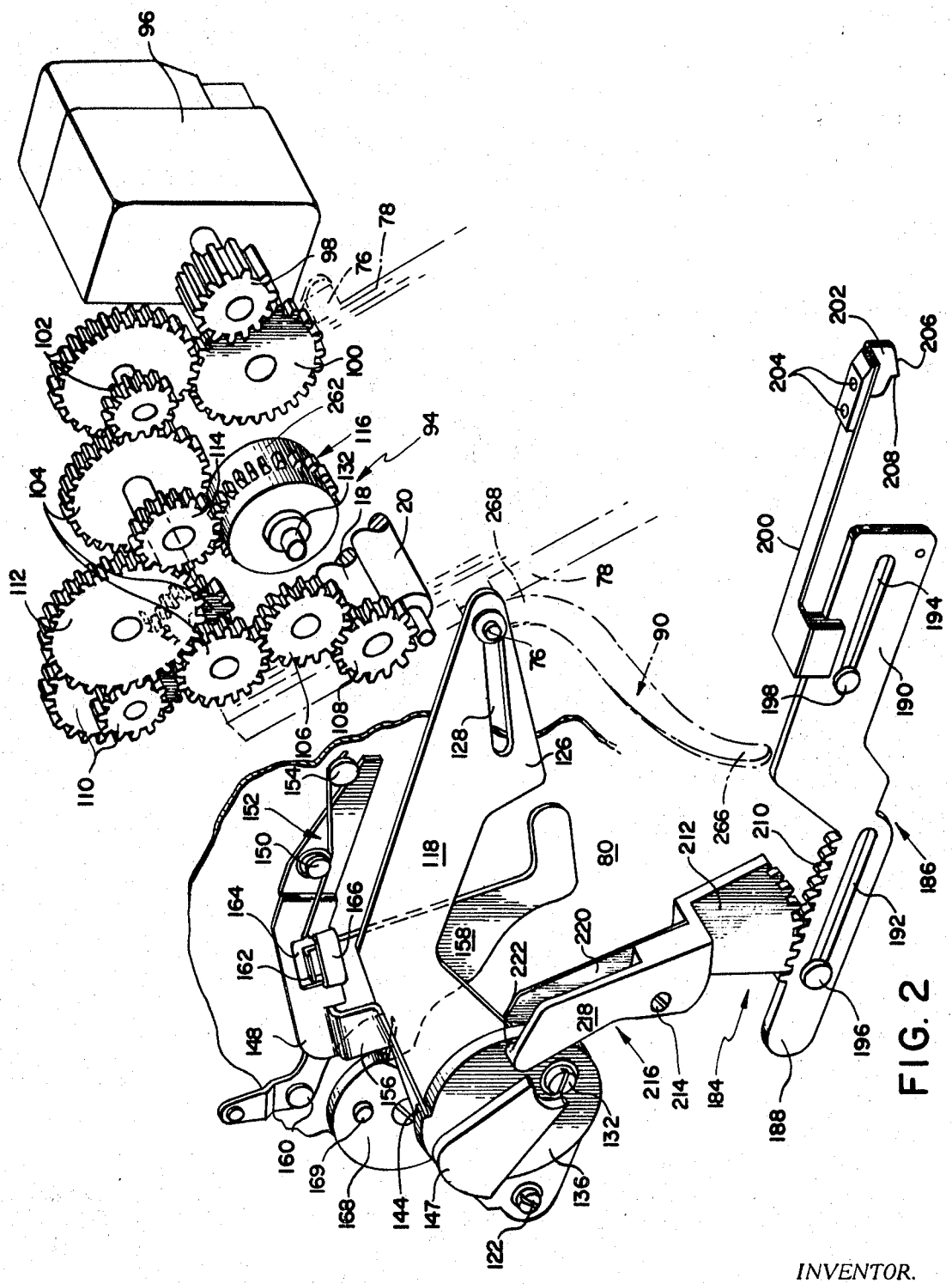
FIG. 2 provides an exploded perspective of a portion of the interior of the camera of the subject invention illustrating the drive mechanism thereof.

The reflex member 70 is provided with a specular reflex mirror 74 on its surface opposite the viewing surface 54 and said reflex member 70 is further provided with a pair of oppositely directed, coaxial pins 76 extending out of its lateral edges 78 (FIG. 2).

As best seen in FIGS. 1 and 4, a pair of spaced parallel support plates 80 and 82 are fixedly secured within the exposure chamber of the camera 10 and extend upwardly from the bottom support portion 22 of said camera 10 to provide sufficient supporting surface for the components connected thereto and described infra.

A pair of link arms 84 (only one of which is shown) is pivotally connected at one end portion to the spaced parallel support plates 80 and 82, respectively, proximate the rear wall portion 26 of the camera 10 as at 86. The other end portions of the link arms 84 are pivotally connected to the opposite lateral edges 78 of the reflex member 70 as at 88.

The connection of the link arms 84 to the spaced parallel support plates 80 and 82 and the lateral edges 78 are such that said link arms 84 are always parallel and move in concert to provide a compound pivot for one end portion of the reflex member 70.

Each of the spaced parallel support plates 80 and 82 is provided with an identical cam slot 90 (only one of which is shown) which extends generally upward from the support portion 22 of the camera 10 and about which more will be said infra. The oppositely directed pins 76 extending outward of the lateral edges 78 of the reflex member 70 are each slideably received within one of the cam slots 90 such that an upward force applied to the oppositely directed pins 76 will cause same to traverse the cam slots 90 and effect movement of the reflex member 70 about its compound pivot to the position shown in phantom at 92.

When the reflex member 70 assumes the position 92, the components of the camera 10 are in an exposure mode configuration, as opposed to the focusing mode previously described. The reflex member 70 is raised to the exposure mode position 92 by drive means shown generally at 94 (FIG. 2) in response to movement of the actuation button 16 (FIG. 13) as will be described in more detail hereinafter.

When the reflex member 70 is moved from the vicinity of the exposure plane 42 to the position 92, the specular reflex mirror 74 is introduced in operative position within the exposure chamber. When the camera 10 is in the exposure mode configuration, the new optical path courses from the objective lens assembly 14 to the specular reflex mirror 74 from which it is reflected and courses to the exposure plane 42 previously described herein. Thus, the uppermost of the plurality of film units 44 may be exposed and thereafter drawn through the slot 40 into the processing rolls 18 and 20 to exit therefrom at a slot (not shown) formed in the front portion of the camera 10.

It should be emphasized at this point that in the exposure mode configuration, the length of the optical path is equivalent to the length of the optical path in the focusing mode configuration previously described. Such path length equalization is achieved by virtue of removal of the viewing surface 54 from a position closely proximate, but a finite distance displaced from, the exposure plane 42, accompanied by the repositioning of the specular reflex mirror 74 in spaced, parallel, overlying relationship with the stationary reflex mirror 52.

In this regard, it should be noted that the reflex mirror surface 74 is displaced an equivalent finite distance from the stationary reflex mirror 52 to compensate for the finite displacement of the viewing surface 54 from the exposure plane 42 in the focusing mode configuration. It should be further noted that, unlike the system utilized in similar prior art systems (such as that illustrated in copending application, Ser. No. 28,567, aforesaid), no portion of the reflex member 70 or viewing surface 54 supported thereon will come in contact with the stationary reflex mirror 52, and the viewing surface 54 will be supported in predetermined spaced parallel relation to said stationary reflex mirror 52 when in the exposure mode configuration as described hereinafter.

Figure 3:
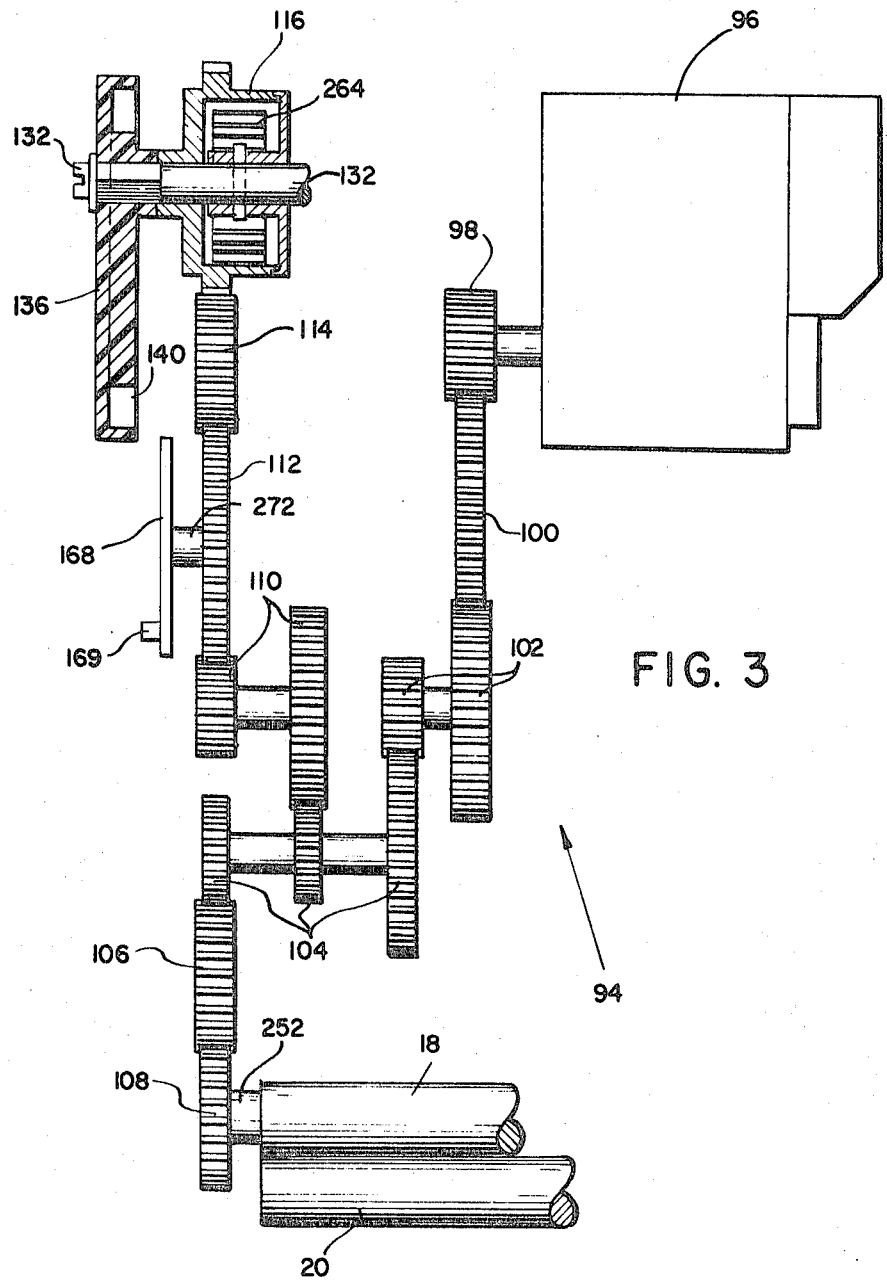
FIG. 3 provides a simplified schematic illustrating a portion of the drive mechanism of FIG. 2.

As best shown in FIGS. 2 and 3, the drive means 94 includes a motor 96, which may be run by a battery in the film-laden cassette structure 24 (which is secured within the camera 10, as to the support plate 82, in a well-known manner). The motor 96 is unidirectional and drives a motor pinion gear 98 which is connected through an idler gear 100 to a first reduction gear assembly 102. The first reduction gear assembly 102 is, in turn, connected to a second reduction gear assembly 104 which, in turn, is connected through an idler gear 106 to a pinion 108 which is coaxially secured to the processing roll 18 so that said processing roll 18 is caused to rotate with the pinion gear 108 to thereby advance a film unit between the processing rolls 18 and 20.

In addition to driving the processing roll 18 via the pinion gear 108, the second gear reduction assembly 104 is connected to a third gear reduction assembly 110. The third gear reduction assembly 110 is, in turn, connected through a one revolution gear 112 and an idler gear 114 to a power spring gear 116 about which more will be said infra.

It should be noted at this point that the one revolution gear 112 is so named because it completes one complete revolution for each complete photographic cycle. That is, each time the photographic camera 10 is converted from the focusing mode to the exposure mode to effect a photographic exposure and, thence, back to the focusing mode and a film unit is processed, the one revolution gear 112 will rotate one complete revolution.

As best seen in FIGS. 2 and 4, a pair of spaced parallel erecting arms 118 and 120 of identical shape are pivotally secured to the support plates 80 and 82, respectively, as by pins 122 and 124 in a well-known manner. As mentioned supra, the erecting arms 118 and 120 are of identical shape and a description of the erecting arm 118 will suffice for the erecting arm 120.

The erecting arm 118 extends along the support plate 80, in spaced parallel relation thereto, to an end portion 126 having an elongated slot 128 therein. The oppositely directed pins 76 which extend through the cam slots 90 in the support plates 80 and 82 further extend through the slots 128 in the erecting arm 118 and the corresponding erecting arm 120 so as to be slideably received therein. The pins 76 are retained within their respective slots 128, as by capping means 130 (FIGS. 2 and 4), in a well-known manner.

As best seen in FIG. 4, a shaft 132 extends through the spaced parallel support plates 80 and 82 and through arcuate slots 134 in the erecting arms 118 and 120, such as the slot 134 of FIG. 1. The arcuate slots such as 134 have a center of curvature at the pivotal center of their respective erecting arms 118 and 120 whereby said erecting arms 118 and 120 may pivot about the pins 122 and 124 without hindrance by the shaft 132.

A pair of cam wheels 136 and 138 are eccentrically secured to opposite end portions of the shaft 132 outward of and spaced from the erecting arms 118 and 120, respectively. The cam wheels 136 and 138 are locked to the shaft 132 for rotation therewith and are provided with annular recesses 140 and 142, respectively, on their opposed facing surfaces. The annular recesses 140 and 142 function as face cams in a manner described in more detail hereinafter.

As best seen in FIGS. 4 and 5, the cam wheels 136 and 138 are identical save that they are provided with shoulder portions 144 and 146, respectively, which are oppositely directed and spaced 180 degrees from each other about their respective peripheries. The cam wheels 136 and 138 are provided with identical profile cam portions 147 and 149, respectively, on their oppositely directed outer faces and which are identically oriented.

As best seen in FIG. 2, a link arm 148 is pivotally secured to the outer face of the support plate 80 between said support plate 80 and the erecting arm 118 as by a pin assembly 150. Spring means 152 are provided having one end portion connected to a fixed pin 154 on the outer surface of the support plate 80 and extending around the pin assembly 150 to an oppositely directed end portion which is secured to the link arm 148 in a well-known manner so as to bias such link arm 148 for counterclockwise rotation about the pin assembly 150, as seen in FIG. 2.

The link arm 148 extends to a generally L-shape end portion 156 which extends outward of the support plate 80 and the erecting arm 118 so as to permit the free pivotal movement of said erecting arm 118 and is adapted to engage the shoulder portion 144 of the cam wheel 136 so as to prevent clockwise rotation of same as seen in FIG. 2.

A generally boot-shape link arm 158 is pivotally connected to the support plate 80 as by a pin assembly 160 and includes a generally L-shape tab portion 162 which is received within slot 164 formed in the link arm 148 by forming an opening therein and bending a portion 166 of the link arm 148 outward to define a strap which is adapted to retain the L-shape tab portion 162 within the opening 164.

The L-shape tab portion 162 of the boot-shape link arm 158 is adapted to engage the upper edge of the slot 164 such that counterclockwise rotation of said boot-shape link arm 158 about said pin assembly 160 will cause said link arm 148 to rotate clockwise about the pin assembly 150 against the bias of the spring means 152.

Figure 12:
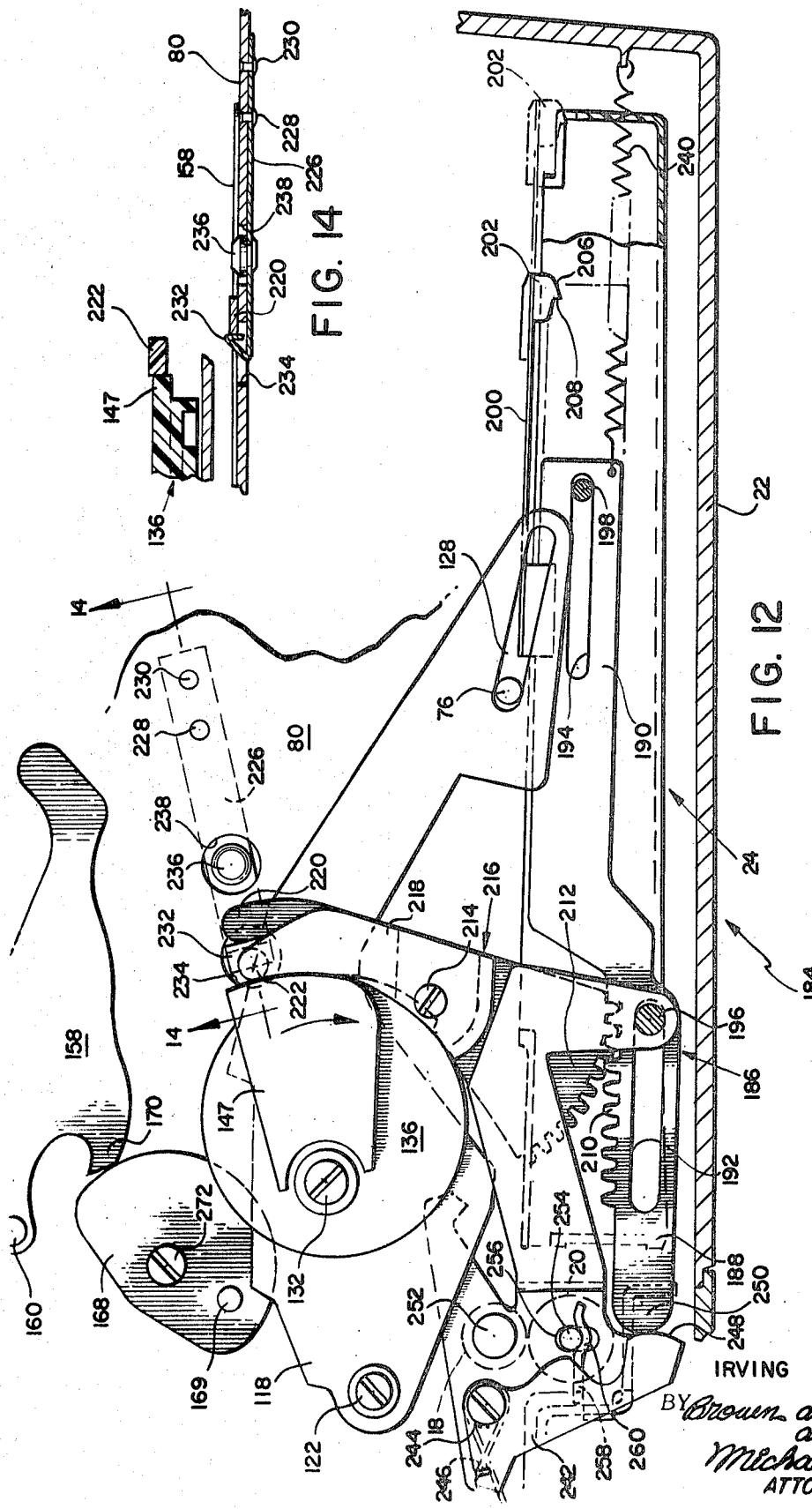
FIG. 12 provides a simplified side elevation of a portion of the film-advancing mechanism of the camera of the subject invention.

A profile cam 168, having a drive pin 169, is pivotally secured to the support plate 80 so as to be freely rotatable between the link arm 118 and said support plate 80, with the drive pin 169 extending from the outer face of said cam 168 in a direction parallel to the pivotal axis of said cam 168. The plane of rotation of the profile cam 168 is generally in alignment with that of the boot-shape link arm 158 and, as best seen in FIG. 12, said boot-shape link arm 158 is provided with a rear edge portion 170 which is biased into engagement with the periphery of said profile cam 168 (due to the counterclockwise bias of the link arm 148 which is transmitted to the boot-shape link arm 158 via the upper edge of the slot 164 and the L-shape tab portion 162).

Figure 13:
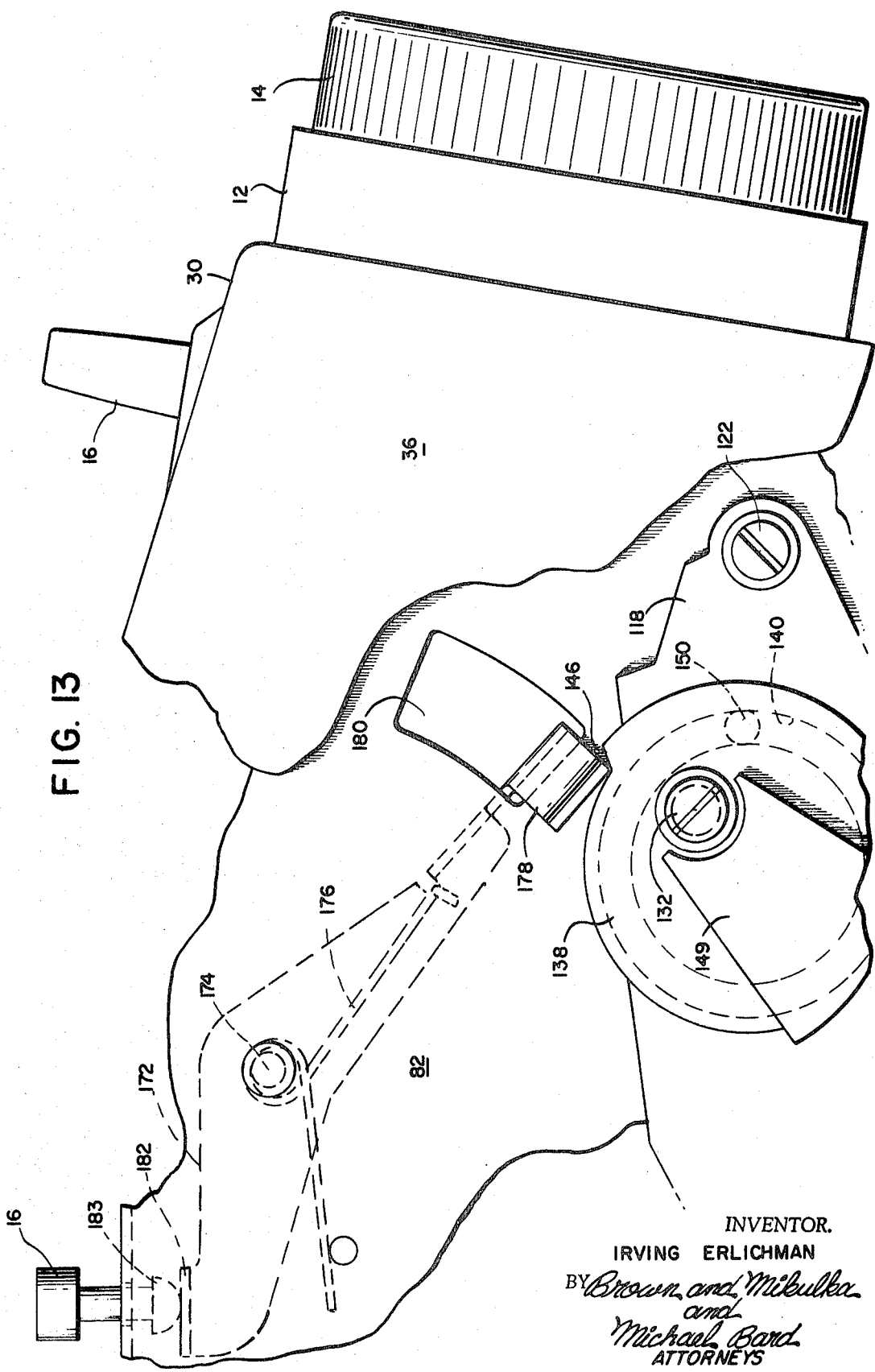
FIG. 13 provides a simplified broken-away plan of one side of the camera of the subject invention illustrating the novel actuating mechanism thereof.

As best seen in FIG. 13, a generally elbow-shape link arm 172 is rockably secured to the support plate 82 as by a pin assembly 174 in a well-known manner. The link arm 172 is biased for clockwise rotation (as seen in FIG. 13) about the pin assembly 174 as by spring means 176.

The link arm 172 extends to a generally L-shape end portion 178 which extends through an arcuate slot 180 in the support plate 82 of the camera 10. The L-shape end portion 178 is so configured that in the position shown (FIG. 13) it is adapted to engage the shoulder portion 146 of the cam wheel 138, whereby said cam wheel 138 will not be able to rotate in a counterclockwise direction (as seen in FIG. 13).

The other end of said elbow-shape link arm 172 extends to a second L-shape end portion 182 which is adapted to engage the actuation button 16 and bias same upward. The upper position of the actuation button 16 is limited by a capping portion 183 in a well-known manner, and it should be clear that, inter alia, depression of the actuation button 16 will cause the elbow-shape link arm 172 to pivot counterclockwise about the pin assembly 174 whereby the L-shape end portion 178 will be disengaged from the shoulder 146 of the cam wheel 138, thereby permitting counterclockwise rotation of said cam wheel 138.

As best seen in FIGS. 2 and 12, the camera 10 is provided with film-advancing apparatus indicated generally at 184. The film-advancing apparatus 184 is identical on both sides of the camera 10 so that, except as hereinafter specifically otherwise described, a description of the component portions of the advancing apparatus 184 connected to the support plate 80 will be understood to relate to similar components connected to the support plate 82.

The film-advancing apparatus 184 is seen to include an arm 186 having a forward portion 188 and a rearward portion 190 offset from said forward portion 188. The arm 186 is provided with a slot 192 in its forward portion 188 and a corresponding slot 194 in its rearward portion 190. The arm 186 is slideably secured to the support plate 80 by means of guide pins 196 and 198 which are slideably received within the slots 192 and 194, respectively. The rearward portion 190 of the arm 186 extends to an elongated resilient finger 200 which is secured thereto in a well-known manner and which, in turn, extends to a pick member 202. The pick member 202 is secured to an end portion of the resilient finger 200 in a well-known manner, as by rivets 204, and includes a ramp portion 206 which extends to a shoulder 208.

It should be noted at this point that the shoulder 208 is of such configuration as to enable said pick member 202 to engage the trailing edge of the uppermost one of the plurality of film units 44 and advance same into the bite of the processing rolls 18 and 20 in a manner to be described in more detail infra. The ramp portion 206 of the pick member 202 enables the pick member 202 and the resilient elongated finger 200 to clear the new uppermost one of the plurality of film units 44 after a previous one of said film units 44 has entered the bite of said processing rolls 18 and 20.

The arm 186 includes a rack 210 along the upper edge of the forward portion 188 which is adapted to engage a sector gear 212 which is pivotally secured to the support plate 80 as by pin means 214. The sector gear 212 extends to a bifurcated upper portion 216 comprising outer and inner finger portions 218 and 220, respectively. The outer finger portion 218 terminates in a generally cylindrical cam follower end portion 222 (FIG. 2) which overlies the outside surface of the cam wheel 136 and is adapted to engage the periphery of the profile cam portion 147 of said cam wheel 136. In a similar manner, the corresponding portion of the sector gear on the other side of the camera 10 is adapted to engage the periphery of the profile cam portion 149 of the cam wheel 138.

As best seen in FIGS. 1, 12, and 14, a resilient spring leaf 226 is secured to the inner face of the support plate 80 as by rivets 228 and 230. The resilient spring leaf 226 extends to an end portion 232 which extends through an opening 234 in the support plate 80 and into the path of travel of the inner finger portion 220 of the sector gear 212.

A button portion 236 of the resilient spring leaf 226 is situate between the end portion 232 and the rivets 228 and 230 and extends through an opening 238 in the support plate 80, in the path of the boot-shape link arm 158. The end portion 232 of the resilient spring leaf 236 is of such shape as to permit the inner finger portion 220 to rotate clockwise (looking into FIG. 12) therepast whilst preventing any counterclockwise rotation of same thereafter. Further, the button portion 236 of the resilient spring leaf 226 is of such configuration as to permit the lower portion of the boot-shape link arm 158 to rotate clockwise therepast whereupon said button portion and, hence, said end portion 232 will be depressed inwardly from said support plate 80 whereby said end portion 232 will no longer inhibit counterclockwise rotation of the inner finger portion 220. It should be emphasized at this point that the construction of the bifurcated upper portion 216 of the sector gear 212 is such as to prevent relative movement between the outer finger portion 218 and the inner finger portion 220 such that any restraint applied to said inner finger portion 220 will be effective in restraining the entire sector gear 212.

As best seen in FIG. 12, the arm 186 is biased in the direction of the rear wall portion 26 of the camera 10 by spring means 240. Similarly, such bias is transmitted through the rack 210 of said arm 186 to the sector gear 212 to thereby bias same in a counterclockwise direction about the pin means 214 whereby said cam follower end portion 222 of the sector gear 212 will be biased into engagement with the periphery of the profile cam portion 147 of the cam wheel 136.

As best seen in FIGS. 12, 16, and 17, spacing links 242 are pivotally secured with respect to the support plates 80 and 82 as by pin means 244 and are biased counterclockwise with respect to said support plates 80 and 82 by spring means 246 in a well-known manner.

As best seen in FIG. 17, the pin means 244 extends between and is pivotally supported by the support plates 80 and 82 and the spacing links 242 (which are identical) are locked to opposite end portions of the pin means 244, outward of their respective support plates 80 and 82, as by screw means 245. The spacing links 242 thus pivot with the pin means 244 and are in registration so that a description of either one will be understood to refer to both.

As best seen in FIGS. 12 and 17, the spacing links 242 are positioned forward of the film-laden cassette structure 24 and extend to an end portion 248 which is adapted to engage the nose portion 250 of the forward portion 188 of said arm 186.

Intermediate the screw means 245 and the end portion 248, each of said spacing links 242 includes a recess portion 247. The recess portions 247 are so configured that when the spacing links 242 are positioned as illustrated in FIG. 16, as prior to the processing of a film unit, a predetermined gap between the processing rolls 18 and 20 will be effected as explained infra.

Considering the pair of processing rolls 18 and 20 in more detail, it will be recalled that the processing roll 18 is driven by the pinion gear 108 and it should be noted that the driving connection between the processing roll 18 and the pinion 108 is provided by a shaft 252 which is rigidly connected to, and coaxial with, the processing roll 18.

The processing roll 20 is rigidly connected to and supported by a shaft 254 coaxial therewith and said shaft 254 is, in turn, supported within identical elongated apertures 256 (only one of which is shown) in the support plates 80 and 82, respectively. The processing roll 20, together with its supporting shaft 254, is adapted to move vertically within the slots 256 toward and away from the processing roll 18.

Resilient spring means 258 (only one of which is shown) are secured to each of the support plates 80 and 82, respectively, in a well-known manner and extend to detent portions 260 within which are received the opposite end portions of the shaft 254. The resilient spring means 258 is so configured as to bias the shaft 254 and the processing roll 20 upward within the elongated apertures 256 toward the processing roll 18.

During the focusing mode of operation of the camera 10, the arm 186 is in its rearmost position toward the rear wall portion 26 and, as best seen in FIG. 16, the spacing links 242 are pivoted with the pin 244, by the spring means 246, to a position whereat they will capture the end portions of the shaft 254 with their recesses 247, and the processing roll 20 will be held in predetermined spaced relation to the processing roll 18. The predetermined spaced relation or pregapping effected by the spacing links 242 functions to facilitate reception of the forward portion of an exposed one of the plurality of film units 44 upon completion of a photographic exposure.

It will be recalled that after completion of a photographic exposure the arm 186 is driven forward against the bias of the spring means 240 by the sector gear 212 to advance the exposed film unit into the bite of the processing rolls 18 and 20. At this time the nose portion 250 of the arm 186 will engage the end portion 248 of the spacing link 242 and pivot same clockwise with the pin means 244 against the bias of the spring means 246 to release the shaft 254 and permit the processing roll 20 to move upward toward the processing roll 18 to properly process the exposed film unit.

As best seen in FIGS. 2 and 4, the spring gear 116 comprises a hollow cylindrical drum 262 which is rotatably secured to said shaft 132 so as to rotate thereon with respect thereto. Disposed within the hollow cylindrical drum portion 262 of said power spring gear 116 is a coil spring 264 which is wound around the shaft 132 internally of the drum 262, with one end of said coil spring 264 being affixed to said shaft 132 and the other end of said coil spring 264 being affixed to the inner cylindrical surface of the drum 262.

The coil spring 264 is so disposed within the drum 262 and connected to the shaft 132 and said drum 262 that clockwise rotation of the power spring gear 116 (looking in the direction of FIG. 2) will cause said coil spring 264 to be wound up and store energy. Thus, it should be clear that at least a portion of the energy transmitted from the motor 96 to the drive means 94 will be stored in the coil spring 264 of the power spring gear 116. Before proceeding, it should be noted that with the coil spring 264 wound up and with the power spring gear 116 secured in fixed position the shaft 132 will be biased for clockwise rotation (looking in the direction of FIG. 2) with respect to the power spring gear 116.

It is now appropriate to consider the operation of the camera 10 in greater detail and it will be assumed that the coil spring 264 has been fully wound by the motor 96 via the pinion gear 98, the idler gear 100, the first reduction gear assembly 102, the second reduction gear assembly 104, the third reduction gear assembly 110, the one revolution gear 112, and the idler gear 114. Further, we will assume that the camera is initially in the focusing mode, as illustrated in FIG. 1, with the reflex member 70 proximate the exposure plane 42.

With the various components positioned as aforesaid, it will be apparent that the shaft 132 is biased in a clockwise direction by the coil spring 264. Note, however, that said shaft 132 is not free to rotate because, as best seen in FIG. 13, the shoulder portion 146 of the cam wheel 138 (which is secured to the shaft 132 for rotation therewith) is in abutment with the L-shape end portion 178 of the elbow-shape link arm 172. At this time, the operator looking through the erect viewfinder apparatus 56 will see the image of a subject on the viewing surface 54 and the operator may proceed to sharply focus the image on the viewing surface 54 by focusing the objective lens assembly 14 in a well-known manner. During this focusing operation, no light from the subject entering the exposure chamber of the camera 10 may reach the uppermost one of the plurality of film units 44 because it is capped by the reflex member 70, as aforesaid. After satisfactorily bringing the subject into focus, the operator is in position to effect an exposure and proceeds to depress the actuation button 16. It should be noted at this point that as best seen in FIG. 16, the arm 186 of the film-advancing apparatus 184 is in its rearwardmost position toward the rear wall portion 26 of the camera 10 and, hence, the pick member 202 of the resilient finger 200 is rearward of the trailing edge of the uppermost one of the plurality of film units 44.

The depression of the actuation button 16 will cause the capping end portion 183 of the button 16 (which, it will be recalled, is biased into engagement with the L-shape end portion 182 of the elbow-shape link arm 172 by the spring means 176) to rotate said elbow-shape link arm 172 counterclockwise (as seen in FIG. 13) about the pin assembly 174 and against the bias of the spring means 176.

Counterclockwise rotation of the elbow-shape link arm 172 will cause the L-shape end portion 178 thereof to move upward within the arcuate slot 180 and disengage from the shoulder 146 of the cam wheel 138 whereupon the shaft 132 will be begin to rotate counterclockwise (as seen in FIG. 13) due to the bias of the coil spring 264 of the power spring gear 116.

Referring again to FIGS. 1 and 13, the counterclockwise rotation of the shaft 132 and the cam wheel 138 (as seen in FIG. 13) will appear as clockwise rotation of the cam wheel 136, looking in the direction of FIG. 1. Such clockwise rotation of the cam wheel 136 will cause the pin assembly 150 and its associated erecting arm 118 to follow the face cam defined by the annular recess 140 causing said erecting arm 118 to pivot in a counterclockwise direction (as seen in FIG. 1) about the pin 122.

Before proceeding, it should be noted that the discussion herein with respect to the interaction of the erecting arm 118 and the cam wheel 136 applies with equal force to the erecting arm 120 and its associated cam wheel 138. It will be recalled that the shaft 132 passes through a slot 134 in the erecting arm 118 and through a similar slot (not shown) in the erecting arm 120 thereby permitting the erecting arms 118 and 120 to rotate about their respective pins 122 and 124 an amount limited only by the extent of their respective slots, such as the slot 134.

As the erecting arms 118 and 120 rotate upward about their respective pins 122 and 124, they will begin to move the reflex member 70 about its compound pivot defined by the link arms 84. Such erection of the reflex member 70 is due to the pair of oppositely directed pins 76 extending outward of the lateral edges 78 of the reflex member 70 which are received within elongated slots in the erecting arms 118 and 120 such as the elongated slot 128. As the erecting arms 118 and 120 continue their upward movement, the oppositely directed pins 76 are caused to both traverse their respective elongated slots such as the elongated slot 128 and simultaneously traverse the identical cam slots 90 in the spaced parallel support plates 80 and 82.

Considering the cam slots 90 in more detail, it should be noted that the lowermost portions 266 thereof define an arc having a center of curvature lying along the axis of the pivotal connections 86 of the link arms 84. Accordingly, as the erecting arms 118 and 120 cause the pins 76 to traverse the lowermost portions 266 of the slots 90, the reflex member 70 will simply pivot about the axis of the pivotal connections 86, as in a simple pivotal connection. The lowermost portions 266 of the cam slots 90 extend to upper portions 268 which define an arc having a center of curvature along an axis through the pins 122 and 124 or, more succinctly, through the pivotal center of the erecting arms 118 and 120. Thus, as the continued upward movement of said erecting arms 118 and 120 causes the pins 76 to enter the upper portions 268 of the arcuate slots 90, the link arms 84 will begin to pivot about the pivotal connections 88, simultaneously with the pivotal action at the connections 86, to effect a compound pivot of said reflex member 70.

The cam slots 90 extend from the upper portions 268 to the uppermost portions 270. The uppermost portions 270 of the cam slots 90 are not arcuate, but, rather, extend in a straight line in predetermined spaced parallel relation to the stationary reflex mirror 52.

It should be noted at this point that the pair of link arms 84 are of precisely predetermined length such that when the reflex member 70 assumes the picture taking or exposure mode position 92, the perpendicular distance from the center of the pivotal connections 86 to the plane of the stationary reflex mirror 52 will equal the perpendicular distance from the center of the uppermost portions 270 of the cam slots 90 to the plane of said stationary reflex mirror 52.

Further, inasmuch as the oppositely directed pins 76 are closely received within the cam slots 90, when the reflex member 70 assumes the position shown in phantom at 92, the perpendicular distance from the center of said pins 76 to the plane of the stationary reflex mirror 52 will also equal the perpendicular distance from the center of the pivotal connections 86 to said mirror 52, insuring that the reflex member 70 is aligned in predetermined spaced relation to said mirror 52. This alignment will be such that the optical path length from the objective lens assembly to the specular reflex mirror 74 and thence to the exposure plane 42 remains equal to the optical path length existing in the focusing mode discussed hereinabove.

Before proceeding further, it should be noted that, as best seen in FIG. 3, the profile cam 168 is connected to the one revolution gear 112 via a shaft 272 whereby the profile cam 168 and the one revolution gear 112 are locked together for rotation with the shaft 272. The shaft 272 is, of course, rotatably supported by the support plate 80 in a well-known manner and extends therethrough with the profile cam 168 being positioned overlying the outside face of the support plate 80 and the one revolution gear 112 being within the exposure chamber.

The profile cam 168 is of suitable shape such that when the photographic cycle begins in the focusing mode illustrated in FIG. 1, the rear edge portion 170 of the boot-shape link arm 158 will be biased into engagement with that portion of the surface of the profile cam 168 such that the boot-shape link arm 158 is positioned over the opening 238 in the support plate 80 (so as to depress the button portion 236 of the resilient spring leaf 226) thereby removing the end portion 232 of said spring leaf 226 from the opening 234.

As the shaft 132 rotates clockwise (looking into FIG. 1), the erecting arms 118 and 120 will be pivoted about their respective pins 122 and 124 by virtue of the fact that their pin assemblies such as the pin assembly 150 will follow the cam surface of the annular recesses 140 and 142 of their respective cam wheels 136 and 138. The upward movement of the erecting arms 118 and 120 and, hence, the reflex member 70 will continue until the cam wheel 136 (and, hence, the shaft 132 and the cam wheel 138) has rotated 180 degrees to bring the shoulder portion 144 to the position shown in phantom in FIG. 5. It should be noted at this point that during the clockwise rotation (as seen in FIG. 1) of the cam wheel 136, the profile cam 168 will be restrained from rotating because of the static load presented by the gear train to the power spring gear 116. Therefore, the boot-shape link arm 158 will remain in the position of FIG. 1, sufficiently counterclockwise about the pin assembly 160 to permit the link arm 148 to remain in a position about the pin assembly 150 such that the L-shape end portion 156 of said link arm 148 will engage the shoulder portion 144 of the cam wheel 136 to prevent further clockwise rotation of said cam wheel 136. At this time, the arms 118 and 120 will be in their fully erected position and the oppositely directed pins 76 of the reflex member 70 will be positioned within the uppermost portions 270 of the cam slots 90 such that said reflex member 70 assumes the position 92 (FIG. 1) and the camera is in the exposure mode configuration. The profile cam 168 will, of course, remain in the position illustrated in FIG. 1.

It is to be understood that the exposure control system housing 12 includes therein a shutter assembly of a type well known in the art and which forms no part of the instant invention. The shutter mechanism does, however, interact with some of the component portions of the instant invention as described hereinafter. When the photographic camera 10 is in the focusing mode configuration, i.e., with the reflex member 70 proximate the exposure plate 42, the shutter assembly (not shown) within the exposure control system housing 12 is open to permit an image of the subject to be formed on the viewing surface 54. When the actuation button 16 is depressed, the shutter assembly closes preventing any light from the subject from entering the exposure chamber of the camera 10. When the reflex member 70 assumes the position 92, it activates a switch (not shown) in a well-known manner which causes the shutter assembly to open a sufficient amount and for a sufficient period of time to permit light from the subject to reach the exposure plane 42 and effect a suitable photographic exposure.

As the shutter assembly closes to complete a photographic exposure, it triggers a switch (not shown) in a well-known manner to send a signal to the motor 96 turning same on. Although the cam wheel 136 and, hence, the shaft 132 is restrained against clockwise rotation (by the L-shape end portion 156 of the link arm 148) at this time, the motor will drive the drive means 94 against the spring load of the power spring gear 116 to effect movement of the one revolution gear 112 a sufficient amount to rotate the profile cam 168 (via the shaft 272) in a clockwise direction an amount sufficient to pivot the boot-shape link arm 158 counterclockwise about the pin assembly 160, thereby pivoting the link arm 148 clockwise about the pin assembly 150 and against the bias of the spring means 152. The link arm 148 will be driven clockwise an amount sufficient to raise the L-shape end portion 156 thereof clear of the shoulder portion 144 of the cam wheel 136, thereby enabling the coil spring 264 of the power spring gear 116 to unwind and rotate the shaft 132 relative to the hollow cylindrical drum 262.

The clockwise rotation of the profile cam 168 will drive the rear edge portion 170 of the boot-shape link arm 158 away from the shaft 272 causing said link arm 158 to rotate counterclockwise about the pin assembly 160 an amount sufficient to free the button portion 236 of the resilient spring leaf 226 and permit the end portion 232 of said spring leaf 226 to again enter the opening 234 in the support plate 80. At the same time, the rotating shaft 132 will carry with it the cam wheels 136 and 138 and their respective profile cam portions 147 and 149 will begin to drive the sector gears such as 212 (as by the cam follower end portion 222 of the outer finger portion 218 of each of the sector gears, such as the sector gear 212). The sector gear 212 will be forced to pivot clockwise about the pin means 214 moving the arm 186 toward the front wall portion 32 of the camera 10 and against the bias of the spring means 240 by means of the interaction between the teeth of the sector gear 212 and the rack 210 of the arm 186.

It should be emphasized that only one resilient spring leaf is provided, that is, the resilient spring leaf 226 which is affixed to the support plate 80 and that similarly, there is only one profile cam 168, boot-shape link arm 158, and link arm 148 provided. Accordingly, it will be understood that the common components attached to the spaced parallel support plates 80 and 82 at opposite sides of the camera 10 function identically save for any interrelationship between those components attached to the support plates 80 and 82 and those component parts described hereinabove which are unique to the support plate 80.

As the spring 264 of the power spring gear 116 continues to rotate the shaft 132, the profile cam portions 147 and 149 continue to advance the arms 186 of the film-advancing apparatus 184 so that the shoulder portions 208 of the pick members 202 engage the trailing edges of the exposed film unit and begin to advance such film unit into the bite of the processing rolls 18 and 20.

As mentioned hereinabove, the processing rolls 18 and 20 are held in a predetermined pregap position by the spacing links 242 to facilitate the reception of the exposed film unit between said processing rolls 18 and 20. Continued rotation of the shaft 132 will cause the inner finger portion 220 of the sector gear 212 to be advanced past the end portion 232 of the resilient spring leaf 226 which, it will be recalled, is now extending through the opening 234 in the support plate 80.

The end portion 232 of said resilient spring leaf 226 is so shaped as to be forced out of the opening 234 by the advancing inner finger portion 220 of the sector gear 212 until said inner finger portion 220 has passed said end portion 232 enabling said end portion 232 to spring back through the opening 234 to prevent any counterclockwise rotation (as seen in FIG. 12) of the sector gear 212 for reasons which will be more apparent infra.

As the shaft 132 continues its clockwise rotation under the influence of the spring 264 of the power spring gear 116, the erecting arms 118 and 120 continue to pivot clockwise about their respective pivot pins 122 and 124 to drive the reflex member 70 toward the focusing mode configuration proximate the exposure plane 42. Additionally, the clockwise rotation of the profile cam portions 147 and 149 of the cam wheels 136 and 138, respectively, continues to drive the sector gears such as the sector gear 212 clockwise, as aforesaid. The profile cam 147 continues to drive the arm 186 toward the front wall portion 32 of the camera 10 so that the nose portion 250 of the arm 186 will engage the end portion 248 of the spacing link 242. Continued forward advancement of the arm 186 will cause the spacing links 242 to pivot with the pin means 244 in a clockwise direction (as seen in FIG. 12) against the bias of the spring means 246. Such clockwise rotation of the spacing links 242 will permit the shaft 254 to be released from said spacing links 242 permitting the resilient spring means 258 to urge the shaft 254 upwardly within the elongated apertures 256 causing the processing rolls 18 and 20 to exert sufficient pressure on the exposed film unit to properly process same. It should be noted at this point that before the exposed film unit enters the space between the processing rolls 18 and 20, said rolls 18 and 20 are held in spaced predetermined relation by the spacing links 242 with the ends of the shaft 254 retained in the lowermost portions of the apertures 256 in the support plates 80 and 82 (FIG. 16).

As the shaft 132 continues its clockwise rotation carrying the cam wheels 136 and 138 therewith, the reflex member 70 becomes fully seated in the focusing or viewing mode configuration of FIG. 1 and the profile cam portions 147 and 149 of said cam wheels 136 and 138, respectively, disengage from the cam follower end portions 222 of the outer finger portions 218 of the sector gears such as the sector gear 212. When such disengagement occurs, the spring means 240 will exert a force pulling the arm 186 toward the rear wall portion 226 of the camera 10 disengaging the nose portion 250 of the arm 186 from the end portion 248 of the spacing link 242 permitting said spacing links 242 to pivot with the pin means 244 (due to the spring means 246) to its initial position (FIG. 16).

Movement of the arm 186 toward the rear wall portion 26 of the camera 10 will also tend to drive the sector gear 212 (via the rack 210) about the pin means 214 in a counterclockwise direction (as seen in FIG. 12) to return said sector gear 212 to the position shown in FIG. 1. However, the disengagement of the nose portion 250 from the end portion 248 and the consequent repositioning of the spacing link 242 and the sector gear 212, as aforesaid, will be delayed a predetermined interval, as explained infra.

When the film-advancing apparatus 184 is in the position shown in FIG. 12 and the film unit is being processed through the processing rolls 18 and 20, a high spot in the film unit being processed may cause the processing rolls 18 and 20 to move apart, i.e., the processing roll 20 may be forced downward in the elongated apertures 256 against the bias of the resilient spring means 258. If at this time the arm 186 were already returned to the rearmost position, it might be possible for the ends of the shaft 254 of the processing roll 20 to be captured by the spacing links 242 because such spacing links 242 would now be in position to receive and retain the end portions of the shaft 254 in predetermined spaced relation to the processing roll 18 and at the bottommost portion of the apertures 256.

If this were to occur, the processing of the film would be interrupted (because, after passage of the high spot in the exposed film unit, contact between the processing rolls and said film unit would be lost and the film unit may be ruined). To avoid such an undesirable consequence, the sector gear 212 (pivotally secured to the support plate 80 by the pin means 214) is restrained against counterclockwise rotation about the pin means 214 by the end portion 232 of the resilient spring leaf 226 which extends through the opening 234 in said support plate 80, as aforesaid. Such restraint of the sector gear 212 prevents the arm 186 from returning to its rearmost position and, hence, prevents the spacing link 242 from pivoting with the pin 244 to assume a position whereat the end portions of the shaft 254 may be captured and held in the predetermined pre-gap position described hereinabove.

While the cam wheels 136 and 138 are rotating clockwise, the profile cam 168 is also being driven clockwise by the motor 96 (through the one revolution gear 112 and the connecting shaft 272, as aforesaid). The profile cam 168 completes one revolution for each complete photographic cycle, that is, from the focusing mode through the exposure mode and back to the focusing mode. It should be emphasized, however, that the profile cam 168 does not rotate at the same rate as the cam wheels 136 and 138 and that said profile cam 168 continues to rotate after the cam wheels 136 and 138 have stopped and the reflex member 70 has assumed the focusing mode configuration.

The rotation of the profile cam 168 is such that just prior to the entry of the trap of the film unit between the processing rolls 18 and 20 the profile cam 168 will assume a position such that the boot-shape link arm 158 will pivot about the pin assembly 160 in a clockwise direction (looking into FIG. 12) to cover the opening 238 and depress the button portion 236 of the resilient leaf spring 226. Such depression of the button portion 236 will cause the end portion 232 of said spring leaf 226 to withdraw from the opening 234 permitting the spring means 240 to return the sector gear 212 to the position shown in FIG. 1 by disengaging the nose portion 250 of the arm 186 from the end portion 248 of the spacing link 242. This will permit the spacing links 242 to pivot with the pin means 244 to its initial position and, as the trap of the film unit enters the processing rolls 18 and 20, the processing roll 20 will be forced downward (against the bias of the resilient spring means 258) within the elongated apertures 256 until the shaft 254 is captured by the recess portions 247 of the spacing links 242, as mentioned previously herein.

When the sector gear 212 is released by the end portion 232 of the resilient spring leaf 226 to permit the arm 186 to return to its initial position, the pick member 202 will resiliently slide back along the edge of the new uppermost one of the plurality of film units 44, which movement will be facilitated by the ramp portion 206 and the resilient elongated finger 200. When the pick member 202 has assumed its rearmost position, the trailing edge of the new uppermost one of the plurality of film units 44 will be engaged by the shoulder 208 for the start of a new cycle.

When the reflex member 70 has assumed the focusing mode position illustrated in FIG. 1, the cam wheel 138 will have rotated to a position bringing the shoulder portion 146 thereof into engagement with the L-shape end portion 178 of the elbow-shape link arm 172. Thereafter, further rotation of the cam wheel 138, the shaft 132 and, consequently, the cam wheel 136 will no longer be possible until the actuation button 16 is depressed, as aforesaid. Nevertheless, the profile cam 168 will continue to be driven by the motor 96 because the power spring gear 116 is spring loaded with respect to the shaft 132 by the coil spring 264, as mentioned supra. When the rotation of the cam wheels 136 and 138 and their connecting shaft 132 has been stopped by the L-shape end portion 178 of the elbow-shape link arm 172, as aforesaid, continued rotation of the motor 96 will cause the coil spring 264 of the power spring gear 116 to wind up and store energy sufficient to raise and lower the reflex member 70 and power a portion of the film-advancing apparatus 184, as mentioned hereinabove.

Typically, the motor 96 may be shut off by a switch (not shown) actuated in a well-known manner as when the shaft 254 has been captured by the spacing links 242 and the exposed film unit has been completely processed. When the motor 96 has been shut off, the power spring gear 116 will be fully wound and the profile cam 168 will be in the position shown in FIG. 1, ready for the start of another photographic cycle.

Considering the function of the profile cam 168 in greater detail, and referring again to FIG. 15, the profile cam 168 is illustrated in solid line showing its position when the reflex member 70 is in the position 92 and in phantom line showing its position as the erecting arms 118 and 120 are returning said reflex member 70 to the viewing mode position.

Before proceeding, it should be emphasized that there is only one profile cam 168 and drive pin 169 and that the interaction between said profile cam 168 and said arm 118 is unique to the erecting arm 118.

As mentioned supra, the closing of the shutter assembly to complete a photographic exposure will trigger a switch to turn on the motor 96. The motor 96 will begin to rotate the profile cam 168 clockwise (looking into FIG. 15) and continue to so drive said profile cam 168 until the exposed film unit has been processed.

When the profile cam 168 has rotated sufficiently to disengage the L-shape end portion 156 from the shoulder 144 of the cam wheel 136, the erecting arms 118 and 120 will begin to drive the reflex member 70 toward its viewing mode position. After the reflex member 70 has been moved a predetermined amount toward its viewing mode position, the profile cam portions 147 and 149 will begin to drive the film-advancing apparatus 184, as aforesaid. By this time the coil spring 264 of the power spring gear 116 will have partially unwound and it may not provide sufficient torque to continue to drive the shaft 132 and its associated mechanism. However, prior to the commencement of the film-advancing function, the profile cam 168 will have rotated to the position shown in phantom in FIG. 15, whereat the drive pin 169 will engage the upper edge of the erecting arm 118.

The drive pin 169 which is being powered by the motor 96, rather than the power spring gear 116, will provide sufficient additional torque to move the reflex member 70 to the viewing mode position and to operate the film-advancing apparatus 184.

Inasmuch as the film-advancing apparatus 184 will have completed its function of advancing the exposed film unit into the bite of the processing rolls 18 and 20 prior to the time the reflex member 70 has capped the exposure plane 42, the supplemental torque provided by the drive pin 169 will no longer be needed and, accordingly, the pin 169 is so positioned and the arm 118 so configured, such that said pin 169 will be able to rotate free of said arm 118 when the latter has reached a predetermined position.

More particularly, when the cam portions 147 and 149 rotate clear of the cam follower end portions 222 of the sector gears 212, the power spring gear will no longer be driving the film-advancing apparatus 184. At this time the coil spring 264 will provide sufficient torque to rapidly propel the erecting arms 118 and 120 toward the viewing mode position (FIG. 1). The arms 118 and 120 will be pivoted clockwise by the coil spring 264 at a faster rate than the rotation of the profile cam 168 and the drive pin 169, whereby the arm 118 will move free of the pin 169 to the position shown in FIG. 1. In the viewing mode position (FIG. 1), the arm 118 will be sufficiently removed from the locus of travel of the pin 169 whereby the latter will be able to rotate to the position illustrated in FIG. 1, free of the erecting arm 118.

Thus, the profile cam 168 and its drive pin 169 provide an auxiliary driving system for the reflex member 70 and the film-advancing apparatus 184 to insure that the reflex member 70 does not stop intermediate its exposure and viewing mode positions due to the load imposed on the main driving mechanism by said film-advancing apparatus 184.

Figure 6:
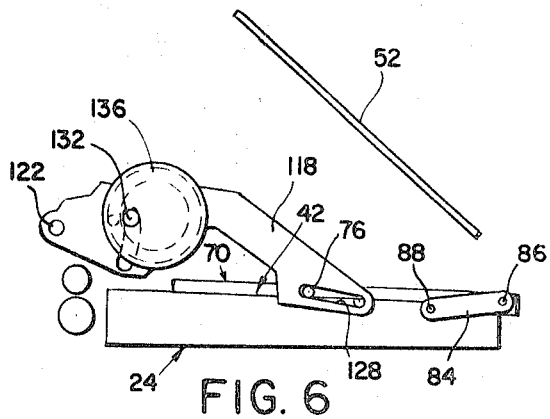
FIGS. 6 – 11 provide a simplified schematic illustration of the erection of the reflex member of the subject invention.
Figure 9:
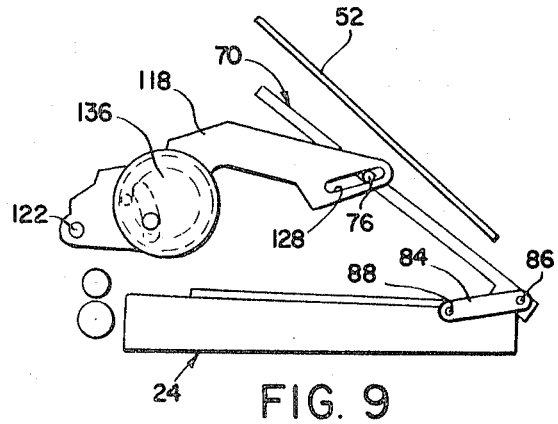
Figure 7:
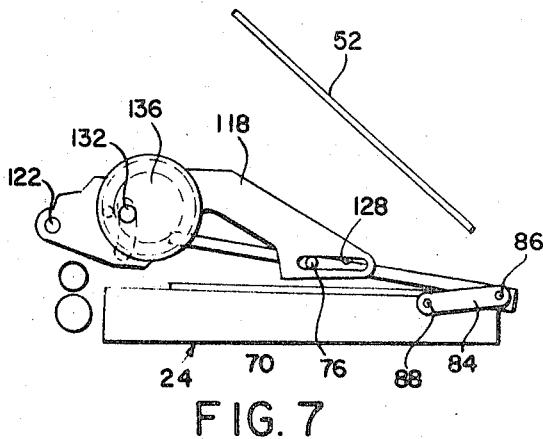
Figure 8:
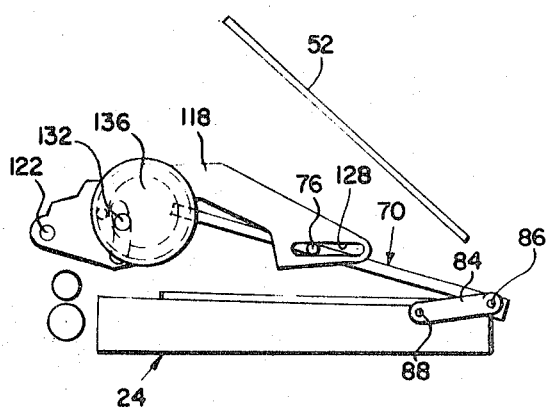
Figure 11:
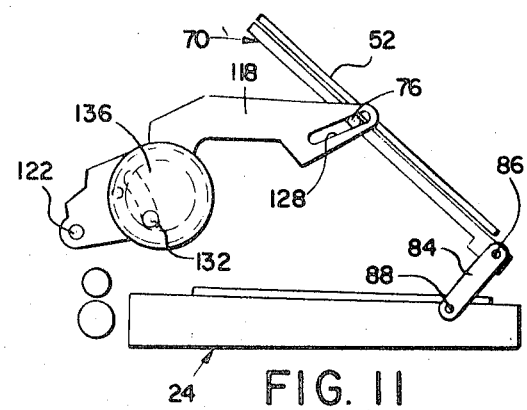

Referring again to FIGS. 6 – 11, the motion of the reflex member 70 as it travels from its focusing mode configuration to its exposure mode configuration may be seen in greater detail. As best seen in FIG. 6, at the start of a photographic cycle (the focusing mode) the reflex member 70 is in a horizontal position overlying the exposure plane 42. When the photographic cycle is commenced by depressing the actuation button 16, the erecting arms 118 and 120 begin to raise the reflex member 70 by pivoting same about the pivotal connections 86 with the link arms 84 remaining stationary. Further erection (to the positions illustrated in FIGS. 7 and 8) of the reflex member 70 is accomplished by pivoting same about the pivotal connections 86 with the link arms 84 remaining stationary.

It will be noted, however, that the oppositely directed pins 76 of the reflex member 70 have moved along the slots 128 in their respective erecting arms 118 and 120 a discernible amount. By the time the reflex member 70 has assumed the position shown in FIG. 9, the oppositely directed pins 76 have traversed the lowermost portions 266 of the cam slots 90 and have moved considerably along the slots 128 from their position of FIG. 6. Up until the position shown in FIG. 9, the erection of the reflex member 70 has taken place entirely by pivoting same about the pivotal connections 86.

Figure 10:
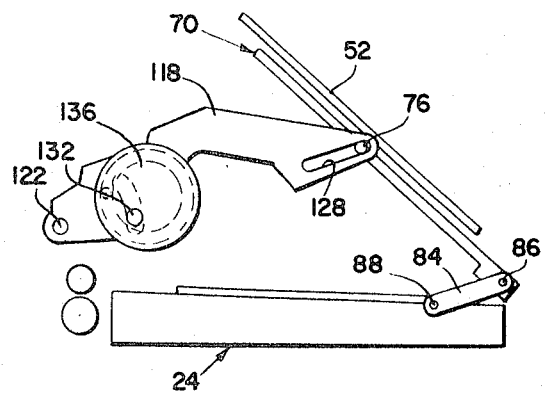

As the erection process to the position shown in FIG. 10 continues, the oppositely directed pins 76 begin to traverse the upper portions 268 of the cam slots 90 and the reflex member 70 continues to pivot about the pivotal connections 86. Note, however, that at this time the pair of link arms 84 are pivoting about the pivotal connections 88 so that the reflex member 70 is now approaching the stationary reflex mirror 52 in a compound manner. As the reflex member 70 continues to travel upward from the position shown in FIG. 10, to its final exposure mode position illustrated in FIG. 11, the oppositely directed pins 76 complete their traverse of the upper portions 268 of the cam slots 90 with the compound pivoting of the reflex member 70 continuing as aforesaid. When the oppositely directed pins 76 of the reflex member 70 get to the very end of the upper portions 268 of said cam slots 90, they are a predetermined spaced distance from the stationary reflex member 52, which predetermined distance is effected by the configuration of the cam slots 90. Thereafter, as the erection process continues, the pins 76 will move parallel to the stationary reflex member 52 whilst the end portion of the reflex member 70, pivotally connected to the link arms 84 at the pivotal connections 86, will approach the stationary reflex member 52 in an arc of radius equal to the distance between the pivotal connections 86 and the pivotal connections 88. The distance between the pivotal connections 86 and 88 is predetermined such that when the reflex member 70 assumes its final exposure mode configuration, it will be parallel to the stationary reflex member 52.

It should be emphasized at this point that the oppositely directed pins 76 do not hit the terminus of the uppermost portions 270 of the cam slots 90 nor do such pins 76 ever reach the end of the slots 128 in the erecting arms 118 and 120. The final position of the pins 76 within the cam slots 90 and the slots 128 is determined by the cam wheel 138 which is so configured that its shoulder portion 146 will engage the L-shape end portion 178 of the elbow-shape link arm 172 when the reflex member 70 has been fully erected to the exposure mode configuration. Thus, it can be seen that the final approach of the reflex member 70 to the stationary reflex mirror 52 will be very nearly parallel to said reflex member 52. Such relative parallel motion coupled with the fact that the pins 76 neither bottom-out in the cam slots 90 nor in the slots 128 aids in significantly eliminating any vibration of the reflex member 70 and, hence, of the specular reflex mirror 74 in a direction perpendicular to the stationary reflex mirror 52 or, stated another way, prevent any undesirable vibration of the specular reflex mirror 74 along the optical axis. Clearly, any vibration of the specular reflex mirror 74 along the optical axis could adversely affect a photographic exposure. Such absence of vibration of the specular reflex mirror 74 greatly reduces the need to delay the start of a photographic exposure and greatly increases the speed with which the reflex member 70 may be erected to the exposure mode position illustrated at 92 in FIG. 1.

The generally parallel approach of the reflex member 70 to the stationary reflex mirror 52 may be accomplished in an alternate manner by making the uppermost portions 270 of the cam slots 90 arcuate with a radius of curvature equal to the distance between the pivotal connections 86 and 88. With the radius of curvature of the uppermost portion of the cam slots 90 equal to the distance between the pivotal connections 86 and 88, the motions of the oppositely directed pins 76 and the pivotal connections 86 between the reflex member 70 and the link arms 84 will be identical and the system will approximate a parallel linkage assembly.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is therefore to be understood that within the scope of the appended claims the instant invention may be practised in a manner otherwise than is specifically described herein.

What is claimed is:

1. In a photographic camera of the self-developing type and having an exposure station, a processing station, and means for advancing an exposed film unit from said exposure station to said processing station; the combination including:
   a plurality of film-processing members;
   means in initial engagement with and for supporting at least one of said processing members in predetermined spaced relation to another of said processing members when said supporting means is in a first position;
   means connected to said film unit advancing means to move said supporting means to a second position to disengage said supporting means upon advancement of said film unit to said processing station whereby said processing members may exert a predetermined pressure on said film unit; and
   means for preventing said supporting means from engaging said one of said processing members by releasably securing said supporting means in said second position for a predetermined time interval.

2. The invention as delineated in claim 1, wherein said engaging preventing means is connected to said film unit advancing means.

3. The invention according to claim 2, wherein said engaging preventing means includes first spring means adapted to engage a portion of said film unit means a predetermined time after said film unit commences advancing to said processing station.

4. The invention as stated in claim 3, wherein said one of said processing members is resiliently mounted with respect to said another of said processing members to exert a continuous pressure on a predetermined portion of said film unit whilst accommodating variations in thickness thereof.

5. The invention as set forth in claim 4, wherein said engaging preventing means includes means for preventing movement of said disengaging means.

6. The invention as recited in claim 5, further including means for disabling said engaging preventing means a predetermined time interval after said film unit reaches said processing station.

7. The invention as described in claim 6, wherein said disabling means includes means for disengaging said first spring means from said film unit advancing means.

8. The invention in conformance with claim 7, wherein said disabling means includes means adapted to engage said first spring means a predetermined time interval after said film unit has reached said processing station.

9. The invention of claim 8, further including means for returning said disengaging means to an initial position upon disabling said engaging preventing means.

10. The invention pursuant to claim 9, wherein said supporting means includes a link adapted to engage a portion of said resiliently mounted processing member and releasably secure same, said link being rotatable to a position whereat said portion of said resiliently mounted processing member will be released therefrom.

11. The invention as set forth in claim 10, wherein said film unit advancing means includes an arm adapted to engage a portion of said link and pivot same to a position whereat said resiliently mounted processing member will be released.

12. The invention in accordance with claim 11, wherein said camera includes support means, said arm is connected at one end portion to said support means by second spring means so as to be returnable to an initial position and said link is pivotally connected to said support means and biased by third spring means toward a position whereat it will releasably engage said resiliently mounted processing member.

13. The invention as set out in claim 12, wherein said film-advancing means further includes:
   cam means;
   cam follower means in engagement with said arm and in releasable engagement with said cam means; said cam follower means being adapted to releasably engage said first spring means.

14. The invention as set forth in claim 13, wherein said disabling means includes second cam means and second cam follower means in engagement with said second cam means and adapted to releasably engage said first spring means.

15. Film-processing apparatus for use with a photographic camera adapted to expose a film unit, including:
   a processing station;
   a plurality of film-processing members positioned proximate said processing station;
   means movable between first and second positions for releasably securing at least one of said plurality of film-processing members in predetermined spaced relation to another of said film-processing members when said releasably securing means is in said first position;
   means for resiliently positioning said at least one of said processing members with respect to said another of said processing members upon movement of said releasably securing means to said second position; and
   means for disabling said releasably securing means for a predetermined time interval by releasably securing same in said second position.

16. The invention pursuant to claim 15, further including means for advancing said film unit from an initial position to said processing station and wherein said releasably securing means includes means in engagement with said advancing means whereby advance of said advancing means to advance said film unit to said processing station will effect movement of said releasably securing means to said second position whereat said one of said processing members will be released therefrom.

17. The invention in conformance with claim 16, further including means for disengaging said releasably maintaining means from said releasably securing means whereby the latter may return to said first position.

18. The invention pursuant to claim 18, further including:
   first cam means;

first cam follower means in releasable engagement with both said first cam means and said releasably maintaining means and movable from a first position whereat said releasably securing means is in its first position to a second position whereat said releasably securing means is disabled; and means for releasably retaining said first cam follower means in its second position for a predetermined time interval.

19. The invention as stated in claim 19, wherein said first cam follower releasably retaining means includes spring means adapted to engage said first cam follower as it moves from its first position to its second position to thereby prevent the return of said first cam follower to its first position.

20. The invention as delineated in claim 20, further including:

second cam means and second cam follower means in engagement with said second cam means and adapted to engage said spring means and remove same from the path of said first cam follower means, whereby said first cam follower means will be able to return to its first position upon disengagement from said first cam means.

* * * * *